United States Patent
Tsuchida et al.

(10) Patent No.: US 7,317,595 B2
(45) Date of Patent: Jan. 8, 2008

(54) SUSPENSION ASSEMBLY AND ROTARY DISK STORAGE DEVICE

(75) Inventors: Hiroyasu Tsuchida, Kanagawa (JP); Hitoshi Tsujino, Kanagawa (JP); Kohichi Suzuki, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 274 days.

(21) Appl. No.: 10/821,478

(22) Filed: Apr. 9, 2004

(65) Prior Publication Data

US 2004/0246625 A1 Dec. 9, 2004

(30) Foreign Application Priority Data

Apr. 23, 2003 (JP) ............................. 2003-118661

(51) Int. Cl.
*G11B 5/48* (2006.01)
(52) U.S. Cl. ................................. 360/245.3; 360/245.9
(58) Field of Classification Search ....... 360/245–245.3, 360/245.6, 245.9
See application file for complete search history.

(56) References Cited

U.S. PATENT DOCUMENTS

| | | | |
|---|---|---|---|
| 4,811,685 A | 3/1989 | Murai | |
| 5,019,931 A | 5/1991 | Ohwe et al. | |
| 5,452,158 A * | 9/1995 | Harrison et al. | 360/245.3 |
| 5,568,332 A * | 10/1996 | Khan | 360/245.3 |
| 5,602,699 A | 2/1997 | Khan | |
| 5,748,409 A | 5/1998 | Girard et al. | |
| 5,956,209 A * | 9/1999 | Shum | 360/244.3 |
| 6,246,547 B1* | 6/2001 | Bozorgi et al. | 360/245.3 |
| 6,362,936 B2 | 3/2002 | Inoue et al. | |
| 6,549,374 B1 | 4/2003 | Ikeda et al. | |
| 6,738,231 B2* | 5/2004 | Arya et al. | 360/294.4 |
| 6,741,426 B2* | 5/2004 | Girard | 360/245.4 |
| 6,831,814 B2* | 12/2004 | Cha | 360/245.3 |
| 2001/0008475 A1 | 7/2001 | Takagi et al. | |
| 2001/0017749 A1* | 8/2001 | Stefansky | 360/294.5 |
| 2003/0223152 A1* | 12/2003 | Erpelding | 360/245.3 |
| 2004/0125510 A1* | 7/2004 | Yang et al. | 360/294.4 |

FOREIGN PATENT DOCUMENTS

| | | |
|---|---|---|
| JP | 63-149888 A | 6/1988 |
| JP | 63-237273 A | 10/1988 |

(Continued)

*Primary Examiner*—Brian E. Miller
(74) *Attorney, Agent, or Firm*—Townsend and Townsend and Crew LLP; Rambod Nader

(57) ABSTRACT

Embodiments of the invention provide a suspension assembly offering large peel stiffness, small pitch stiffness and small roll stiffness. In one embodiment, the suspension assembly includes a load beam and a flexure 100. The flexure is connected to the load beam at a first fixing point 102a and a second fixing point 102b. The flexure is provided with a first loop spring structure including a pair of supporting arms 108a, 108b and a pair of strip-shaped main arms 104a, 104b. In addition, the flexure is provided with a second loop spring structure including a pair of supporting arms and a pair of strip-shaped auxiliary arms 106a, 106b having a path length longer than that of the main arms. The flexure is further provided with a flexure tongue 112 supported by a pair of tongue supports. The loop spring structure composed of the main arms dominantly gives the flexure tongue stiffness.

25 Claims, 11 Drawing Sheets

FOREIGN PATENT DOCUMENTS

| | | |
|---|---|---|
| JP | 63-273286 A | 11/1988 |
| JP | 64-39676 A | 2/1989 |
| JP | 06-176518 A | 6/1994 |
| JP | 06-223522 A | 8/1994 |
| JP | 07-78436 A | 3/1995 |
| JP | 07-254246 | 3/1995 |
| JP | 08-45211 A | 2/1996 |
| JP | 08-45219 A | 2/1996 |
| JP | 08-77738 A | 3/1996 |
| JP | 08-77739 A | 3/1996 |
| JP | 09-198824 A | 7/1997 |
| JP | 2001-176229 | 8/2001 |
| JP | 2002-269712 | 9/2002 |

* cited by examiner

PRIOR ART

PRIOR ART

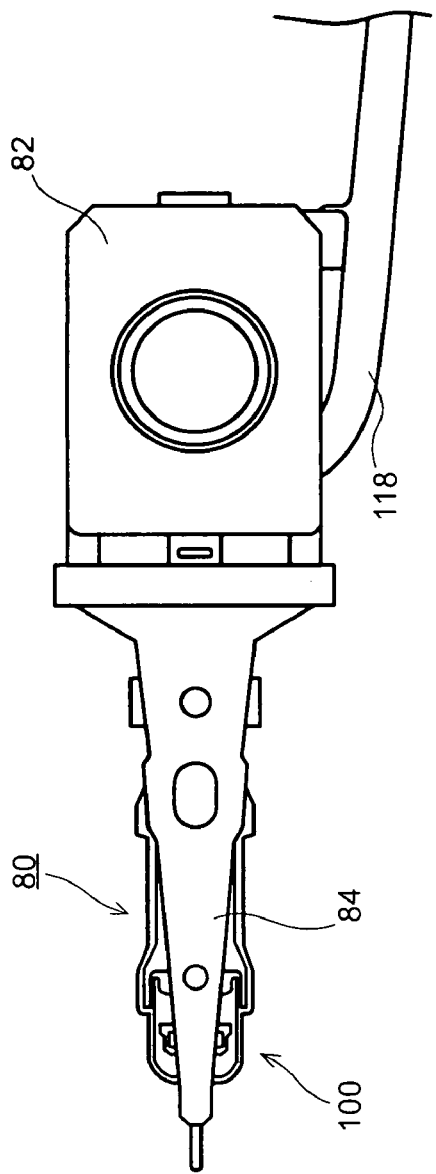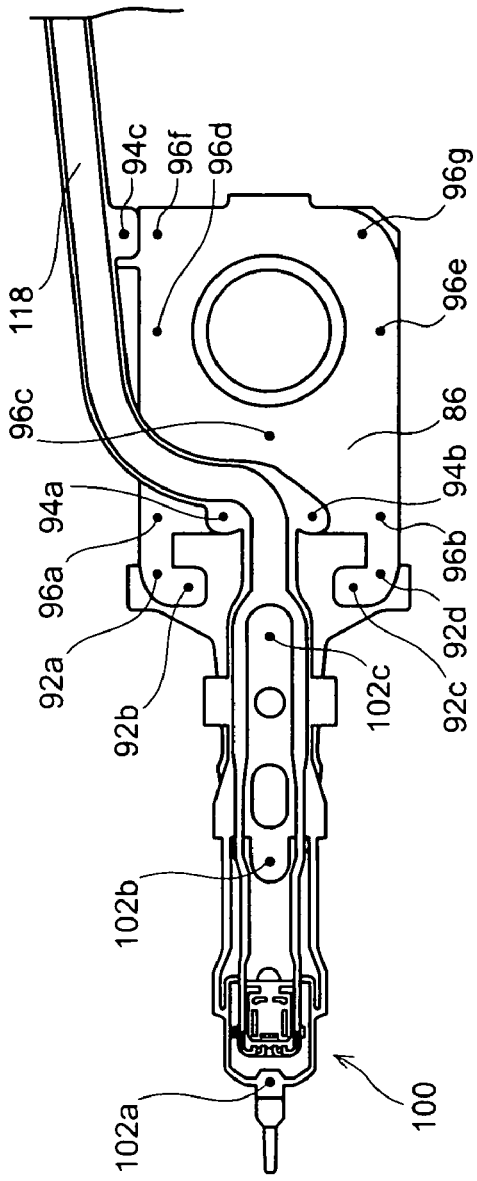

SUSPENSION ASSEMBLY AND ROTARY DISK STORAGE DEVICE

BACKGROUND OF THE INVENTION

The present invention relates to suspension assemblies used in rotary disk storage devices such as magnetic disk devices or the like and, more particularly, to a suspension assembly exhibiting excellent performance in a track follow-up ability, an impact resistance, and a load/unload operation.

In a magnetic disk device, a rotary magnetic disk as a recording medium rotates at a high speed and a head moves across a surface of the magnetic disk in a floating position with respect thereto for reading and writing data. The head is mounted on a slider and the slider is supported by a suspension assembly. The suspension assembly, supported by an actuator mechanism, is arranged so as to be movable in a substantially radial direction of the magnetic disk. When the magnetic disk rotates at a high speed, a viscous air flow generated on the surface of the magnetic disk flows between an air bearing surface (ABS) formed on a bottom surface of the slider and the surface of the magnetic disk to form an air bearing. This gives the slider an ascending force and the slider, as a result, floats above the disk by retaining a slight gap therefrom.

FIG. 1 shows a schematic view of a common head suspension assembly 5. The head suspension assembly 5 is formed as a multi-piece type suspension assembly comprising a mount plate 2, a load beam 4, a hinge 13, a flexure 6, and a wiring layer 8. A slider 9 is attached to a side, facing a disk, of the flexure 6. The slider 9 is provided with a head (not shown) for reading and writing data. The head suspension assembly 5 is mounted to an actuator arm forming part of an actuator mechanism by the mount plate 2. The hinge 13 performs a function of adjusting a load and stiffness of the load beam 4 by separating the load from the stiffness.

The wiring layer 8 is connected to a head having one end which is attached to the slider 9. The wiring layer 8 is laminated on the surface of a metal layer of the flexure 6 by a photolithographic etching process, the wiring layer 8 being formed as a stack of layers including a dielectric material layer, a conductive material layer, and a protective layer. The wiring layer 8 is further provided with an area separated from the metal layer and extending aerially.

The load beam 4 brings the slider to a position near a predetermined track in accordance with the operation of the actuator mechanism. In addition, the load beam 4 generates a negative pressure for pressing the slider down against the surface of the magnetic disk. The slider 9 maintains a predetermined distance from, and thus floats above, the surface of the magnetic disk by balancing the ascending force received from the air bearing acting as a positive pressure against the negative pressure created by the load beam 4.

FIG. 2 is a plan view of the flexure 6 shown in FIG. 1 as viewed from the disk side. The flexure 6 is formed of a thin stainless steel metal layer overall. A supporting area 18 has a portion serving as a weld spot 20 that is spot-welded to the side of a supporting end of the load beam 4. A pair of arms 10a, 10b extends from the supporting area 18 toward a leading end of the load beam 4 and is joined together at a leading end area 16. In addition, the flexure 6 includes a flexure tongue 12 formed in such a manner as to be supported by the leading end area 16 and the arms 10a, 10b.

A dimple contact point, or a DCP, is defined at substantially a center of the flexure tongue 12. The slider 9 (not shown) is bonded to the flexure tongue 12 so that the DCP is substantially centered on the slider 9. Further, wiring layers 11a, 11b are laminated on the metal layer. The wiring layers 11a, 11b depart from the metal layer at an end portion of the supporting area 18 and are terminated so as to align with the position of a bonding pad provided in the slider 9. A limiter 14 is formed on the side of the actuator arm of the flexure tongue 12.

FIG. 3 shows a schematic construction of a side face of the flexure 6 shown in FIG. 2. The flexure tongue 12 is supported by a cantilever structure formed by the supporting area 18 of the metal layer welded to the load beam 4 at the weld spot 20 and the two arms 10a, 10b. A dimple 7 is formed in the load beam 6 by a stamping operation. The dimple 7 comes in contact with a substantial center portion on the bottom of a slider-mounting surface of the flexure tongue 12 to form the DCP. The slider 9 flexibly pivots about the dimple 7, floating on the air bearing formed on the magnetic disk to perform a follow-up movement.

A pivotal motion is generally known as a pitch and roll motion or a gimbal motion. An error can occur when the slider is aligned with the track due to various manufacturing errors occurring in different component parts making up the magnetic disk device or irregularity in behavior of the air bearing or the suspension assembly. The slider, however, makes the pivotal motion to cause a slight pitching motion or rolling motion, thereby maintaining the air bearing and thus compensating for the error.

The rolling motion is that which occurs when, as shown in FIG. 1, the slider that is positioned so that the air bearing surface forms a predetermined angle with respect to the disk surface makes a pivotal motion about an X-axis, which is a longitudinal direction of the suspension assembly. Meanwhile, the pitching motion is a pivotal motion made by the slider about a Y-axis included in a plane perpendicular to the X-axis and parallel with the disk surface. Characteristics of the pitching motion and the rolling motion are determined by an entire structure of the suspension assembly. The following nonetheless holds true: the smaller pitch stiffness and roll stiffness of the flexure tongue, the better the track follow-up ability, thus realizing a better compensation motion.

BRIEF SUMMARY OF THE INVENTION

It is necessary that a flexible support be provided in order to allow the slider to maintain a follow-up motion to follow a shape of the disk surface, should it change, while the slider is floating above, and making a follow-up motion of, a predetermined track. The conventional flexure has been developed with special emphasis on the pitch stiffness and the roll stiffness of the flexure tongue in order to mainly improve the follow-up ability.

With the recent trend toward an increased recording density of the magnetic disk device, an altitude of the slider floating above the magnetic disk surface becomes lower. The magnetic disk device also finds its applications more in mobile devices. These trends call for even greater impact resistance. In a magnetic disk storage device operating on a load/unload system, the slider is retracted (unloaded) to a retraction mechanism called a ramp provided adjacently the disk when the disk is to be brought to a stop. If the disk is to be accessed, the disk is first rotated to produce the viscous air flow and the slider is then moved (loaded) from the ramp to the disk surface. During the loading and unloading operation, the slider undergoes a motion in a vertical direction as the slider is raised away from the disk surface and lowered toward the disk surface.

To improve impact resistance of the device and ensure a stabilized operation of the slider without allowing the slider to come into contact with the magnetic disk during the loading and unloading operation, it is important to consider a new characteristic called peel stiffness, in addition to the conventional pitching characteristic and rolling characteristic for the flexure. The peel stiffness refers to a vertical stiffness encountered when a force is applied to the flexure tongue along a line perpendicular to the disk surface. It is preferable that the peel stiffness be as large as possible from the viewpoints of impact resistance and loading/unloading operation.

The peel stiffness has conventionally been a characteristic lacking in necessity for evaluation during an ordinary operation, in which the slider remains floating above the disk surface. Much consideration has not therefore been given to the peel stiffness as one of the parameters to be considered for the suspension assembly. In particular, with the magnetic disk device adopting a contact start stop system, little consideration has been given to the peel stiffness.

The flexure may be considered to be of a spring structure supporting the slider on a pivot obtained from the load beam. In a conventional flexure structure, making the peel stiffness greater results in the pitch stiffness and the roll stiffness becoming greater at the same time. No matter how stiffness parameters are adjusted, it is not possible to realize a flexure having small pitch stiffness and small roll stiffness with great peel stiffness.

There has therefore been a need for realizing a flexure that meets ostensibly mutually contradicting characteristics for a single spring structure, that is, small pitch stiffness and small roll stiffness with large peel stiffness. It is therefore a feature of the present invention to provide a flexure for realizing a suspension assembly capable of meeting a new requirement of emphasizing the importance of the peel stiffness. Specifically, a feature of the present invention is to provide a high performance suspension assembly used in a rotary disk storage device such as a magnetic disk device or an optical magnetic disk device.

Another feature of the present invention is to provide a suspension assembly for improving impact resistance and being excellently applicable to the load/unload system. Still another feature of the present invention is to provide a suspension assembly having a large peel stiffness, and a small pitch stiffness and a small roll stiffness. A further feature of the present invention is to provide a rotary disk storage device using the suspension assemblies described in the foregoing.

A flexure forms a spring structure comprising a fixed end connected to a load beam and a free end of a flexure tongue for supporting a slider. The elements making up the spring structure each have a parameter for varying stiffness assigned to the flexure tongue. It is desirable to give the flexure contradicting stiffness characteristics in which peel stiffness is large, while pitch stiffness and roll stiffness are held small. In the conventional flexure structure as explained with reference to FIG. 2, it has not been possible to achieve satisfactory values simultaneously for the three types of stiffness, no matter how parameters of width and length of the arm and the like are intricately controlled. One of the reasons for this is that adjusting a parameter value relating to the arm results in the effect of stiffness caused by the wiring layer.

To solve the problem relating to a flexure formed of a limited material and permissible restricted space, a flexure of a new structure is created in which parameters contributing to the peel stiffness can conceivably be separated from parameters contributing to the pitch stiffness and the roll stiffness. To allow a spring effect to be exhibited at its maximum when the slider is supported by a spring structure from above, the spring effect can be utilized most efficiently by supporting the slider at a position right above the slider. The peel stiffness is the longitudinal stiffness of the flexure tongue. Therefore, if the same spring structure is used to support the slider, the closer the distance between a center point of the slider or the DCP and the supporting area, the larger the peel stiffness can therefore be made.

If the distance between the DCP and the supporting area is made short, however, it generally results in the pitch stiffness and the roll stiffness becoming large at the same time. Further, since the wiring layer extends from the side of the load beam supporting end to the slider, a stiffness effect from a shorter length of the wiring layer on the flexure tongue cannot be ignored if the wiring layer is integrally laminated on the metal layer of the flexure. According to one feature of the present invention, to allow parameters of the spring structure to be set by eliminating the effect from the wiring layer, a dominant spring structure supporting the flexure tongue from the side of the leading end of the load beam is introduced. Owing to this structure, the distance between the DCP and the supporting area on the leading end side can be made short, thus allowing the peel stiffness to be made large.

In addition, a basic arrangement is adopted in which the peel stiffness is made large by eliminating the effect from the wiring layer. Because of this arrangement, it is possible to realize a flexure keeping the pitch stiffness and the roll stiffness low, without allowing the peel stiffness to be lowered, by determining values of certain parameters as selected from among the various parameters of the spring structure. When parameter values of the spring structure are changed to set the pitch stiffness and the roll stiffness, it affects the peel stiffness; however, the peel stiffness is greatly governed by the parameter of the distance between the DCP and the supporting area, which has first been established. This allows the flexure having the peel stiffness higher than the conventional type to be obtained even when the various parameters of the spring structure are varied so as to make the pitch stiffness and the roll stiffness low.

Further, to enable mass production of the flexure of such a structure as that described in the foregoing, the flexure tongue is supported by an auxiliary spring structure also from the side of the supporting end of the load beam. The auxiliary spring structure, which also supports the flexure tongue, indeed affects stiffness thereof. Since the stiffness of the flexure tongue is realized by the dominant spring structure on the leading end side, parameters and values thereof are selected so that the auxiliary spring structure has less effect on the stiffness.

A first aspect of the present invention provides a loop spring structure for a slider by interposing a flexure provided with a metal layer between a load beam and the slider. The metal layer is provided with a first supporting area connected on a leading end side to the load beam and a second supporting area connected on a supporting end side to the load beam. A first loop spring structure and a second loop spring structure extend from the first supporting area and the second supporting area, respectively, to support a flexure tongue.

Each of the loop spring structures is provided with parameters governing stiffness of the flexure tongue. Possible parameters that can be adopted include, for example, a material, a path length, a thickness, a width, and a path shape of a strip-shaped arm. One or more parameters are appropriately selected from among these parameters and a value or values are defined for the selected parameters. This varies the stiffness of the flexure tongue.

The parameters and the associated values of the second loop spring structure are determined in such a manner that the second loop spring structure assigns a smaller stiffness to the flexure tongue than the first loop spring structure. It is therefore possible to assign the stiffness to the flexure tongue predominantly using the first loop spring structure. A wiring layer extends from the supporting end side of the load beam toward the slider and the first loop spring structure extends from the first supporting area connected on the leading end side to the load beam. Because of this arrangement, the first loop spring structure can bring the DCP and the first supporting area closer to each other within a physically permissible range for increased peel stiffness.

When a parameter relating to the first loop spring structure is selected and the associated value thereof is changed, it is possible to obtain a flexure provided with the pitch stiffness and the roll stiffness kept low, and the peel stiffness maintained large. A pair of arms are formed symmetrically with respect to a center line of the load beam. The term "strip-shaped arm" implies that the arm is of a shape that mainly includes portions branching out from the first supporting area or the second supporting area and extending in an elongated manner. The arm in this case may still be provided with a portion that is locally widened or partially narrowed.

When the first loop spring structure and the second loop spring structure support the flexure tongue, each of the first loop spring structure and the second loop spring structure may support the flexure tongue independently of each other, or instead, a common portion such as a supporting arm may be provided for supporting the flexure tongue. The first supporting area and the second supporting area may be connected as a whole to the load beam. Alternatively, each of the first supporting area and the second supporting area may be provided with one or more specific fixing points for connection to the load beam.

According to this aspect of the present invention, the first loop spring structure dominantly supports the flexure tongue, while the second loop spring structure supports the flexure tongue in an auxiliary manner. The second loop spring structure is nonetheless given another function. The second loop spring structure is provided to enable mass production by maintaining positions of the first supporting area, a pair of the first loop spring structures, and the flexure tongue in an assembly process of the suspension assembly. If the second loop spring structure is not provided, the aforementioned parts are supported only with the wiring layer during the assembly process, which makes it difficult to mount onto the load beam. The wiring layer is laminated on the metal layer in the second supporting area by a known method.

In a specific embodiment in accordance with the present invention, an arrangement allowing a preferable stiffness to be obtained is provided by limiting parameters, such as the material and thickness of the metal layer, the shape, width, and length of the loop spring structure, and the like. By adopting the basic structure itself according to the present embodiment, it is possible to realize a suspension assembly offering the peel stiffness larger than that of the suspension assembly of the conventional structure, while maintaining the pitch stiffness and the roll stiffness equivalent to those of the suspension assembly of the conventional structure.

The first spring structure giving a relatively large stiffness and the second spring structure giving a relatively small stiffness can be specified as a ratio of stiffness each of the first spring structure and the second spring structure gives. According to the present embodiment, the spring structure supporting the leading end side gives the flexure tongue a dominant stiffness, whereby a suspension assembly offering an ideal stiffness can be obtained by avoiding the effect from the wiring layer and isolating parameters relating to the peel stiffness. To allot a dominant ratio of stiffness, a difference is provided for the values of parameters of each spring structure.

A suspension assembly according to another aspect of the present invention is provided with a supporting structure supporting the flexure tongue at a position near the leading end with respect to a center of a mounting position of the slider. As a result, when the suspension assembly is applied to a magnetic disk device operating based on the load/unload system, the slider is lowered toward the disk surface with the head side first during loading and is raised with the leading end side first during unloading. This eliminates the possibility of the slider touching the disk surface during loading or unloading. When the flexure tongue is supported at a position near the leading end with respect to the center of the mounting position of the slider, the side edges of the flexure tongue may be supported from both ends, or the leading end may be supported directly.

BRIEF DESCRIPTION OF THE DRAWINGS

FIGS. 6(A) and 6(B) are a plan view showing the suspension assembly shown in FIG. 5 as viewed from above and a plan view showing the suspension assembly shown in FIG. 5 as viewed from a bottom, respectively.

FIG. 7, including

DETAILED DESCRIPTION OF THE INVENTION

Figure 4:
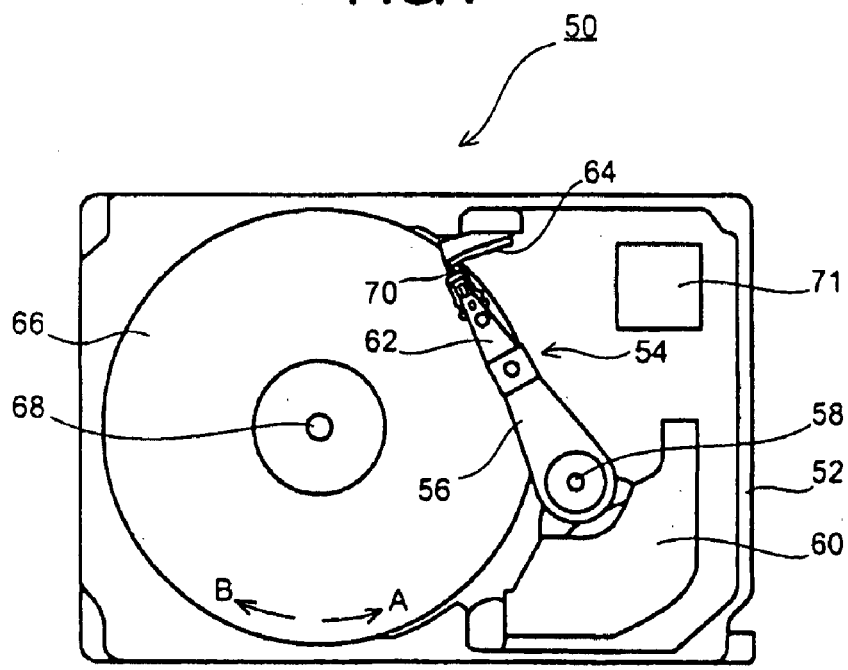
FIG. 4 is a plan view showing a schematic construction of a magnetic disk device in accordance with an embodiment of the present invention.

Specific embodiments of the present invention will be explained with reference to the accompanying drawings. Like reference numerals are used to denote like parts throughout the entire figures. FIG. 4 is a plan view showing a schematic construction of a magnetic disk device 50 in accordance with specific embodiments of the present invention. A housing 52 defines an enclosed space with a housing lid (not shown) joined to the upper surface thereof. There are accommodated inside the housing 52 an actuator suspension assembly 54, a magnetic disk stack 66, a ramp 64, a logic card 71, and the like.

The magnetic disk stack 66 is mounted in a laminated fashion on a spindle hub (not shown) so that a single disk or a plurality of disks can be rotated integrally with each other around a spindle shaft 68. A recording surface is formed on each of a front side and a backside of the magnetic disk. The actuator suspension assembly 54 includes an actuator arm 56 and a suspension assembly 62 that turn about a pivot shaft 58. A voice coil motor 60 is disposed rearward of the actuator arm 56 to pivotally drive the actuator arm 56. The actuator arm 56, the pivot shaft 58, and the voice coil motor 60 constitute a rotary type actuator.

The suspension assembly 62 is mounted at a leading end of the actuator arm 56. The suspension assembly 62 is composed of a load beam and a flexure (both not shown). The flexure supports a slider mounted with a head. The slider receives from a surface of the magnetic disk stack 66 an ascending force produced from an air flow. The slider, as a result, floats above the disk, while retaining a slight gap therefrom. The head may read and write data, or may either read or write data only.

A tab 70 is formed at a leading end of the load beam. Before bringing a rotating disk to a stop, the actuator suspension assembly 54 allows the tab 70 to slide along a retracting surface of the ramp 64 so that the slider can be retracted, while being lifted away from the surface of the magnetic disk. The sets of tabs 70, the suspension assemblies 62, and the actuator arms 56 are laminated so as to respectively face the recording surfaces of the magnetic disk stack 66.

The magnetic disk stack 66 rotates in a direction of an arrow A. The magnetic disk stack 66 rotates in the so-called a forward direction, i.e., from a side of the pivot shaft 58 of the actuator suspension assembly 54 or the supporting end side of the load beam, toward a side of the tab 70 or the leading end side of the load beam. According to specific embodiments of the present invention, a suspension assembly suitable for a magnetic disk device turning in a backward direction as shown by an arrow B in FIG. 4 is also provided.

Figure 5:
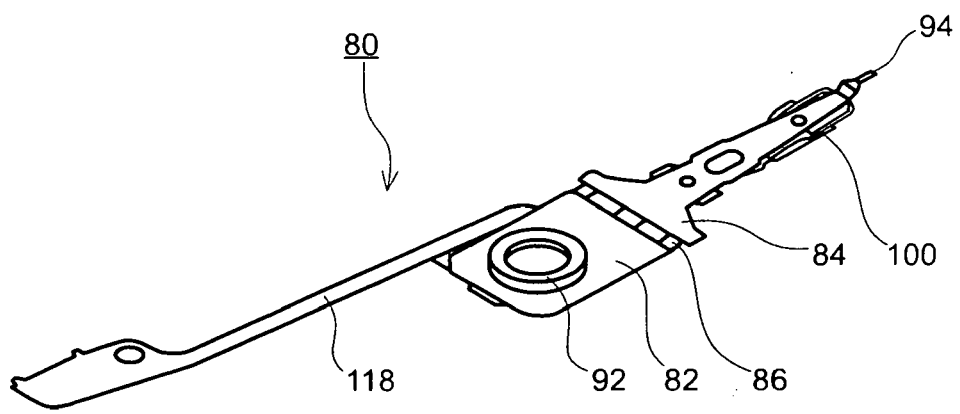
FIG. 5 is a perspective view showing schematically a suspension assembly in accordance with another embodiment of the present invention.

FIG. 5 is a perspective view showing schematically a suspension assembly 80 used in the magnetic disk device 50. The suspension assembly 80 is of the so-called a multi-piece type comprising a mount plate 82, a load beam 84, a hinge 86, a flexure 100, and a wiring layer 118. The load beam according to the present invention is not limited to this multi-piece type. A three-piece type or other known type of load beam may be adopted in the present invention. A swage spud 92 of the suspension assembly 80 is fitted into a hole in the actuator arm 56 and then the suspension assembly 80 is subjected to a swaging process for establishing a joint.

FIG. 6(A) is a plan view of the suspension assembly 80 shown in FIG. 5 in an enlarged scale as viewed from a location above the load beam and FIG. 6(B) is a plan view of the suspension assembly 80 shown in FIG. 5 in an enlarged scale as viewed from a bottom of the load beam. FIG. 6 (B) illustrates a variety of welding spots indicating the positions of spot-welding. Each of the weld spots is welded by use of Joule heat generated when current is allowed to pass therethrough under pressure. Three weld spots 102a to 102c are located on a center line of the load beam and there should be no point of connection between the flexure 100 and the load beam 84 provided between the weld spots 102a and 102b.

Weld spots 92a through 92d represent, respectively, points of welding between the hinge 86 and the load beam 84. Weld spots 96a through 96g represent, respectively, points of welding between the hinge 86 and the mount plate 82. Weld spots 94a through 94c represent, respectively, points of connection between the flexure 100 and the hinge 86.

Figure 7A:
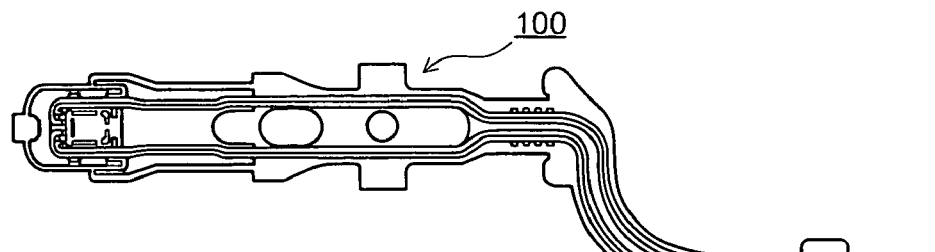
FIG. 7(A) through 7(E), shows constructions of the flexure of the suspension assembly shown in FIG. 5.

FIG. 7, including FIGS. 7(A) through 7(E), illustrates constructions of the flexure 100 shown in FIG. 6. The flexure 100 is formed as a laminated structure using micromachining techniques such as a photolithographic etching process, a deposition process, and the like. FIG. 7(A) shows the flexure 100 completed by laminating a plurality of layers one on top of another. FIGS. 7(B) through 7(E) show, respectively, constructions of the plurality of layers making up the flexure. FIG. 7(A) illustrates the completed flexure 100 as viewed from the disk side. FIGS. 7(B) through 7(E) show different layers laminated in order of laminating toward the disk surface.

Figure 7B:
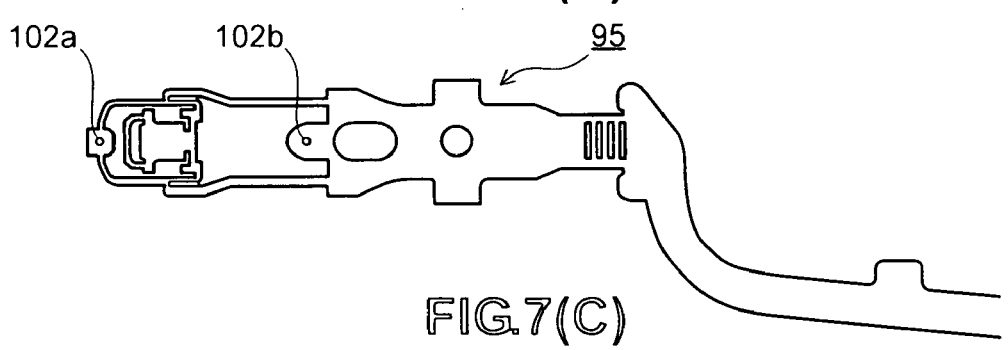

FIG. 7(B) is a plan view showing a metal layer 95. For the material used, SUS304 with a thickness of 0.02 mm is selected from among stainless steels in the 300 series. The stainless steel as applied to the specific embodiments of the present invention should preferably be selected from among those having a thickness ranging from 0.015 mm to 0.025 mm. The metal layer 95 may be stamped into a desired shape. Stainless steel is not the only possible material for the metal layer 95. Rather, it may be possible to select another hard spring material, such as beryllium, copper, titanium, or the like.

The metal layer 95 forms a spring structure of the flexure 100. A uniform thickness is assigned for the metal layer 95 according to the specific embodiments of the present invention. Since the thickness of the metal layer 95 is one of the parameters defining the stiffness the spring structure gives, however, the thickness may be varied locally to establish a parameter value. A metal layer with a thickness changing locally can be easily formed by a known etching process. The material used is also another parameter and a different material may be incorporated locally.

FIG. 7(B) shows weld spots 102a and 102b. The respective positions of the weld spots 102a and 102b, and the shape, thickness, dimensions, and the like of the metal layer 95 present at a portion between the weld spots 102a, 102b, are characteristically formed to provide the features of the present invention. They ensure small pitch stiffness and small rolling stiffness, while maintaining large peel stiffness.

Figure 7C:
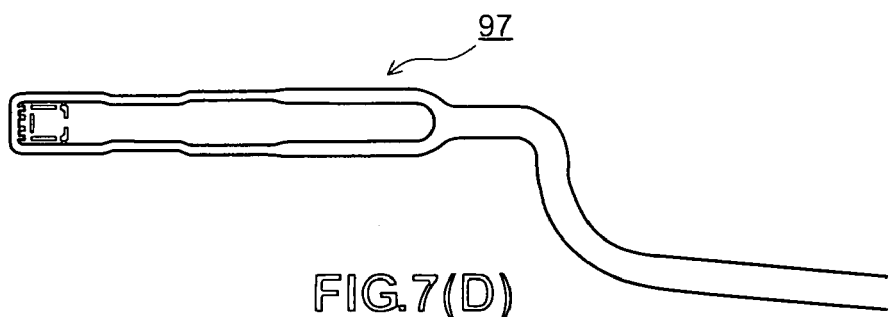
Figure 7D:
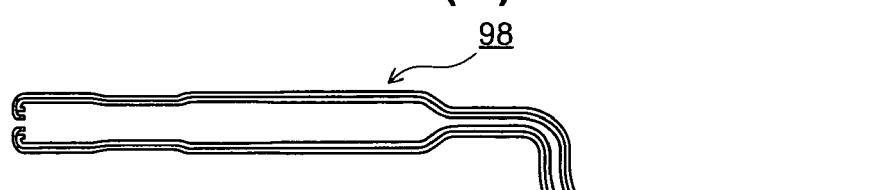

FIG. 7(C) shows a dielectric layer 97 formed of polyimide for insulating the metal layer 95 from a copper layer 98 (see FIG. 7(D)). The dielectric layer 97 is laminated on the metal layer 95 in such a manner as to coincide with a path of the copper layer 98 patterned thereon. The copper layer 98 provides a path for electrical signals for the head and is insulated from the metal layer 95 through the dielectric layer 97. A thickness of about 0.01 mm is selected for the thickness of the dielectric layer 97 according to the embodiment. The thickness may still be selected from a range from about 0.005 mm to 0.020 mm. It is to be noted that part of the dielectric layer 97 is used for position control for the slider when the slider is mounted.

Figure 7E:
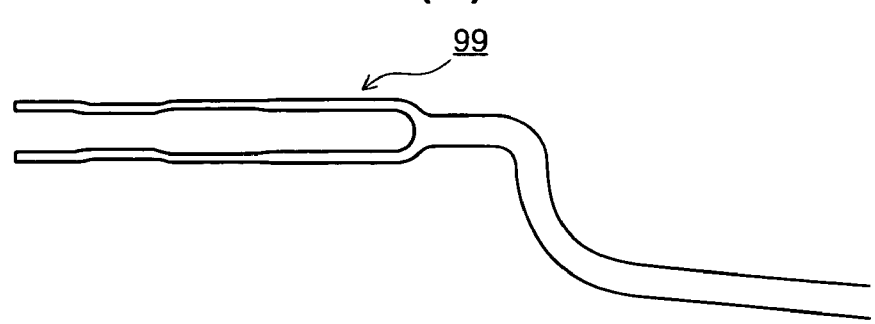

FIG. 7(D) shows the copper layer 98 forming a wiring pattern for the head mounted on the slider. In accordance with the embodiment, although pure copper is patterned to provide a thickness of about 0.01 mm, the thickness of the copper layer 98 may range from about 0.005 mm to 0.020 mm. FIG. 7(E) shows a cover layer 99. To protect the surface of the copper layer 98, a layer of polyimide having a thickness of about 0.003 mm is deposited thereon to form the cover layer 99. The dielectric layer 97, the copper layer 98, and the cover layer 99 integrally constitute the wiring layer 118. A gold plating or other technique may be used, instead of the cover layer 99, to protect the surface of the copper layer 98.

Figure 8:
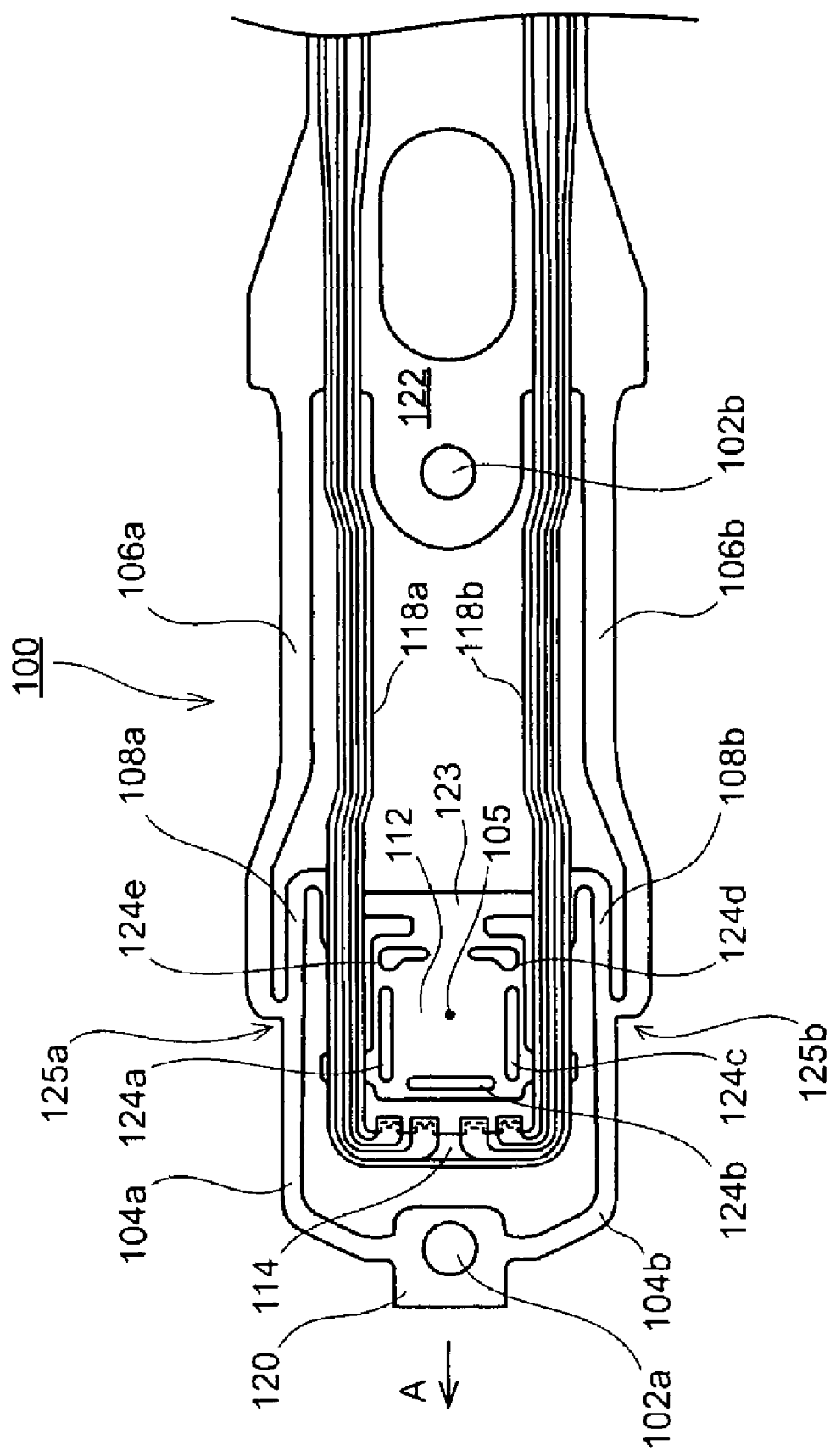
FIG. 8 is an enlarged view showing the flexure shown in FIG. 7(A).

FIG. 8 is an enlarged view of the flexure 100 shown in FIG. 7(A). The metal layer 95 of the flexure 100 is spot-welded to the load beam (not shown) at two locations, namely the weld spot or fixing point 102a on a leading end side and the weld spot or fixing point 102b on a supporting end side. In this specification, a side of the tab 70 of the suspension assembly is referred to as the leading end side, while a side of the actuator arm 56 is referred to as the supporting end side (see FIG. 4). No other fixing points in relation to the load beam are provided between the fixing point 102a and the fixing point 102b. This frees the flexure 100 from a restraint of the load beam over the range described in the foregoing, allowing the flexure 100 to perform a gimbal motion.

A flexure tongue 112 is disposed between the fixing point 102a and the fixing point 102b, at a location near the fixing point 102a on the leading end side. The slider is bonded to a substantial center of the flexure tongue 112. A DCP 105 is defined substantially at a center of the flexure tongue 112 along a center line connecting the fixing point 102a and the fixing point 102b.

A supporting area 120 on the leading end side forming part of the metal layer 95 is spot-welded to the load beam at the fixing point 102a. A pair of main strip-shaped arms 104a, 104b extend from edge portions near the fixing point 102a symmetrically with respect to the center line connecting the fixing points 102a, 102b toward the supporting end side. The supporting area 120 is spot-welded to the load beam at a substantial center thereof. A plurality of weld spots may nonetheless be provided for fixing the supporting area 120 to the load beam.

Each of the main arms 104a, 104b is provided with a portion perpendicular to the center line, a portion in parallel with the center line, and a portion running slantwise relative to the center line. The main arms 104a, 104b enclose the flexure tongue 112 and then extend toward the supporting end side. The main arms 104a, 104b are joined together with sub arms 106a, 106b, respectively, at positions 125a, 125b to form supporting arms 108a, 108b, respectively, thereby supporting a leading edge 123 of the flexure tongue 112. The leading edge 123 refers to an end portion of the flexure tongue 112 on the side opposite to a side on which the head is located when the slider is mounted to the flexure. The leading edge 123 is generally a side, in which a viscous air flows toward the air bearing surface of the slider.

An end portion of the flexure tongue 112 on the side opposite to the leading edge 123 is called a trailing edge. In this specification, the terms leading edge and trailing edge are used to refer to the slider mounted to the flexure tongue. Further, in this specification, of edges of the flexure tongue, portions on both sides running parallel with the center line connecting the fixing points 102a and 102b are referred to as side edges.

The flexure 100 is applied to a magnetic disk device rotating in the forward direction. The magnetic disk rotates in a direction denoted by arrow A pointing from the supporting end side toward the leading end side with respect to the flexure. The viscous air created on the disk surface flows from the leading edge side of the slider and sneaks into a space between the air bearing surface and the disk surface, then exiting from the trailing edge side. Thus, the viscous air flow gives the slider an ascending force.

A supporting area 122 forming part of the metal layer 95 is spot-welded to the load beam at the fixing point 102b. A pair of the sub arms 106a and 106b symmetrically extend from end portions near the fixing point 102b toward the leading end side. The pair of the sub arms 106a, 106b are provided with a portion running in parallel with the center line and a portion running slantwise relative to the center line. The sub arms 106a, 106b are respectively joined together with the main arms 104a, 104b at the positions 125a, 125b, respectively and support the flexure tongue 112 through the supporting arms 108a, 108b, respectively. The entire area of the supporting area 122 may be connected to the load beam.

The main arms 104a, 104b are each formed into a width of about 0.1 mm for a portion extending from where it branches out from the supporting area 120 to each of the positions 125a, 125b. The supporting arms 108a, 108b are each formed into a width of about 0.075 mm in an area near the positions 125a, 125b, respectively, and a width of about 0.1 mm in an area near the leading edge 123. The sub arms 106a, 106b are each formed into a width of about 0.125 mm for a portion extending from where it branches out from the supporting area 122 to a portion running in parallel with the center line. In addition, the sub arms 106a, 106b are each formed into a width of about 0.1 mm in an area near each of the positions 125a, 125b.

It is preferable that the width of each of the main arms 104a, 104b, the sub arms 106a, 106b, and the supporting arms 108a, 108b be selected from a range between about 0.075 mm and 0.15 mm. The lower limit is determined according to manufacturing conditions. The upper limit is established based on a width value that is considered to be preferable when the material and thickness of the metal layer are determined as described in the foregoing. If the material and thickness are changed, a width value falling within a range other than the aforementioned one may be adopted.

Polyimide areas 124a to 124e are formed on the flexure tongue 112. The polyimide areas 124a to 124e are used for position control on the slider when the slider is bonded on top of the flexure tongue 112 with an adhesive. These polyimide areas 124a to 124e are affixed to the metal layer 95 during an affixing process on the dielectric layer shown in FIG. 7(C).

In addition, a pair of wiring layers 118a and 118b symmetrical with each other extend in parallel with the center line from the supporting end side of the supporting area 122 to the trailing edge side of the flexure tongue 112. The wiring layers 118a, 118b are laminated on the metal layer in the supporting area 122 forming part of the metal layer. In a portion after the wiring layers 118a, 118b are separated from the supporting area 122, the wiring layers 118a, 118b extend up to the supporting arms 108a, 108b near the flexure tongue without being laminated on any other area of the metal layer.

A platform 114 is formed on the trailing edge side of the flexure tongue 112. When the copper layer 98 forming the wiring layers 118a, 118b is connected to a bonding pad provided on a side face of the trailing edge of the slider, the platform 114 provides an area for positioning and bonding. An electric connection is made on the platform 114 between the bonding pad provided on the side face of the slider and the copper layer 98 by laser emission to a solder ball.

Figure 9:
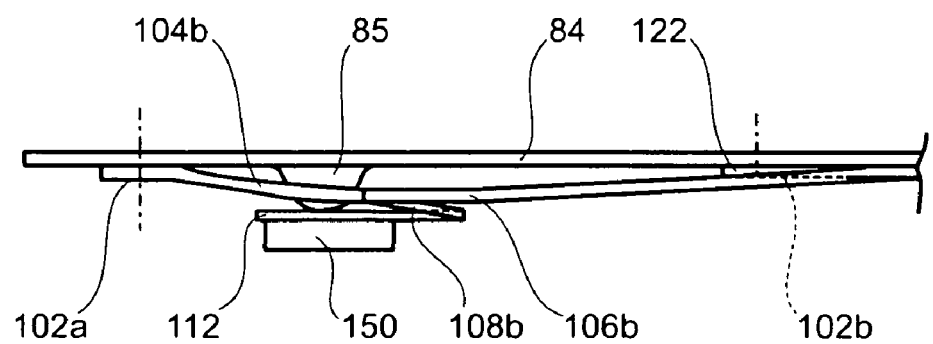
FIG. 9 is a side elevational view showing part of the suspension assembly shown in FIG. 5.

FIG. 9 is a side elevational view showing exaggeratedly the flexure 100 shown in FIG. 8 mounted on the load beam 84. A slider 150 is bonded with an adhesive to the flexure tongue 112 of the flexure 100 in such a manner as to be substantially centered in the flexure tongue 112. A slider having dimensions of about 0.85 mm in length×0.7 mm in width×0.23 mm in thickness is adopted in the embodiment. A flexure to which a slider having different dimensions of about 1.25 mm in length×1.0 mm in width×0.3 mm in thickness is applied may also be realized through an arrangement similar to that described in the foregoing.

A dimple 85 is formed in the load beam 84 so as to be in contact with the surface opposite to a surface of the flexure tongue 112 on which the slider is mounted at a position at which a perpendicular line passing substantially through a center of gravity of the slider passes. The dimple 85 thereby provides the flexure tongue 112 with a fulcrum for a pivotal motion of the slider, that is, the DCP. According to the embodiment, the dimple is formed so as to be about 50 μm high from the surface of the load beam. The height of the dimple may generally be selected from a range between about 30 μm and 70 μm. The dimple can also be provided in the flexure instead of the load beam.

According to the embodiment, the interval between the fixing point 102a and the fixing point 102b is set to about 3.55 mm, the distance between the DCP 105 and the fixing point 102a is set to about 1.25 mm or less, and the distance between the DCP 105 and the fixing point 102b is set to about 2.35 mm or more. To state it another way, the distance between the DCP 105 and the fixing point 102b is set to about 1.8 times as large as the distance between the DCP 105 and the fixing point 102a.

The distance between the DCP 105 and the fixing point 102a is a value significant in terms of enhancing the peel strength in the flexure according to the embodiment limiting the material and the thickness of the metal layer. One skilled in the art will appreciate that the reason why the distance is set with reference to the position of the fixing point 102a may be that, while the stiffness of the supporting area 120 itself is so large that it can be ignored from a viewpoint of stiffness given to the flexure tongue, the position at which the main arms 104a, 104b branch from the supporting area 120 on the leading end side is close to the fixing point 102a.

A path length of the sub arm is set to about 1.5 times as long as a path length of the main arm. The path length of the main arm, as the term is used herein, refers to a length measured along a center of a strip-shaped arm formed as the main arms 104a, 104b extend from the point of branching from the supporting area 120 by way of the supporting arms 108a, 108b to the flexure tongue 112. The path length of the sub arm, as the term is used herein, refers to a length measured along a center of a band-shaped arm formed as the sub arms 106a, 106b extend from the point of branching from the supporting area 122 by way of the supporting arms 108a, 108b to the flexure tongue 112. Both terms are used to provide the same meanings throughout this specification, as explained in the foregoing.

The embodiment includes an arrangement, in which the main arms and the sub arms directly support the flexure tongue without providing the supporting arms. A path length in this case is taken by measuring a length along a center of a strip-shaped arm extending from the position of branching from the respective supporting areas to the flexure tongue.

Figure 1:
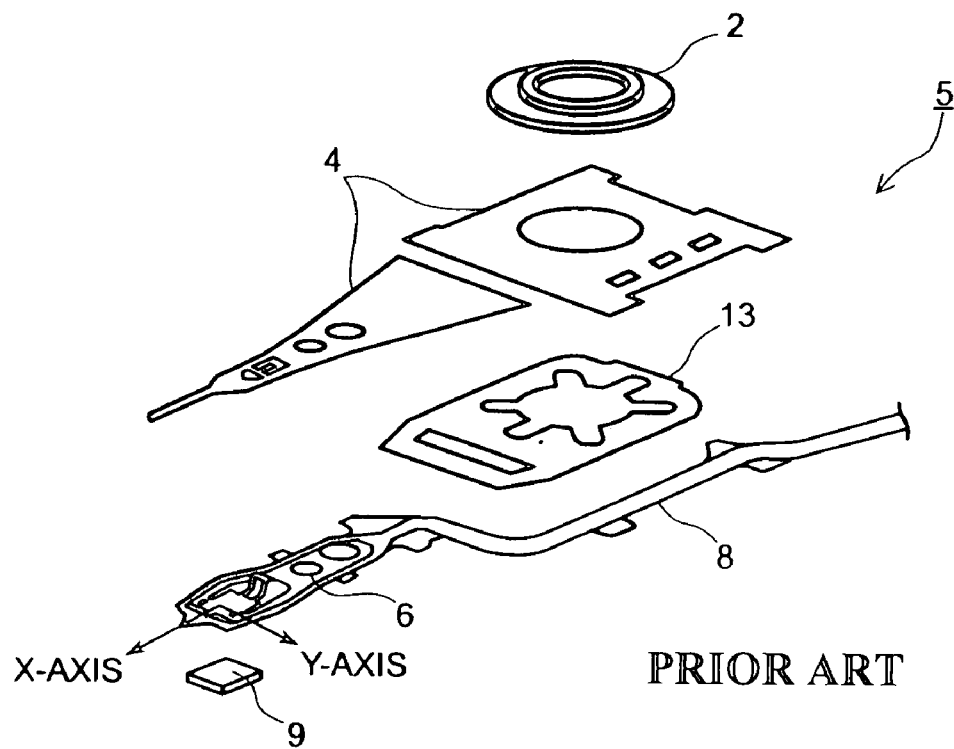
FIG. 1 is a perspective view showing a schematic construction of a conventional suspension assembly used in a magnetic disk device.
Figure 2:
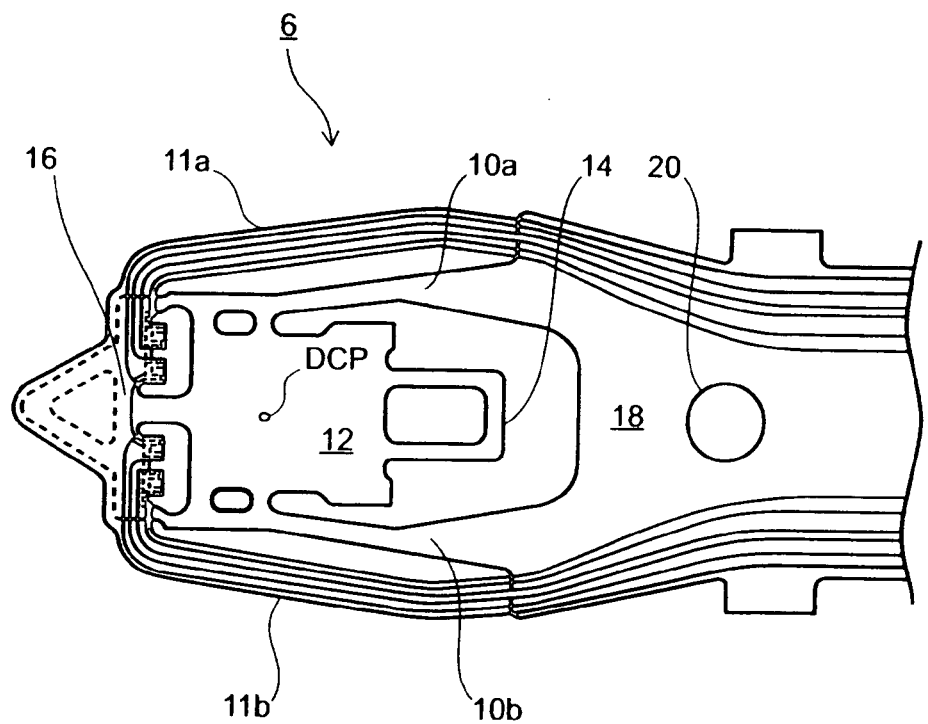
FIG. 2 is a plan view of the flexure shown in FIG. 1.
Figure 3:
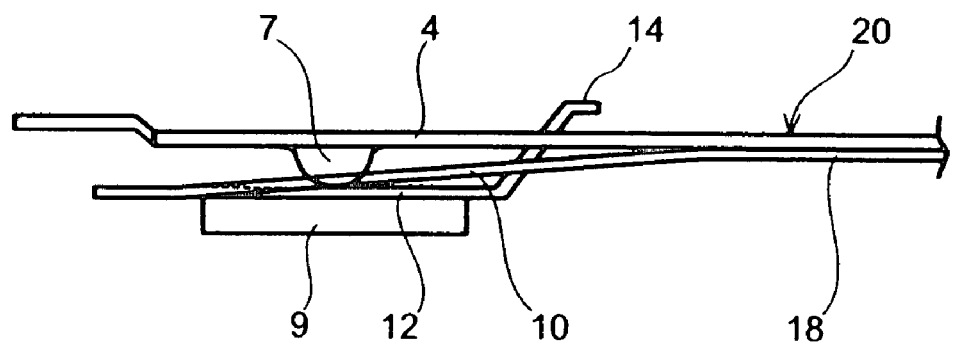
FIG. 3 is a view of a flexure tongue shown in FIG. 1 as viewed from a side.

The analyses of stiffness using a finite element method (FEM) showed that the peel stiffness of the flexure 100 was 88.79 N/m, the pitch stiffness of the flexure 100 was 0.666 μNm/deg., and the roll stiffness of the flexure 100 was 0.856 μNm/deg. The analyses of stiffness of the flexure 6 according to the conventional arrangement as explained with reference to FIG. 2 showed that the peel stiffness of the flexure 6 was 70.89 N/m, the pitch stiffness of the flexure 6 was 1.530 μNm/deg., and the roll stiffness of the flexure 6 was 1.370 μNm/deg. This shows that the peel stiffness of the flexure 100 is up to 125%, the pitch stiffness thereof is down to 43.5%, and the roll stiffness thereof is down to 62.5%, as compared with the corresponding stiffness values the flexure 6 offers.

The pitch stiffness (μNm/deg.) implies a moment (μNm) encountered when the flexure tongue is tilted about the DCP by a unit angle in a pitching direction. The roll stiffness (μNm/deg.) implies a moment (μNm) encountered when the flexure tongue is tilted about the DCP by a unit angle in a rolling direction. The peel stiffness (N/m) implies a force required for displacing the flexure tongue by a unit length in a magnetic disk direction at the DCP position. One skilled in the art will be able to measure the pitch stiffness, the roll stiffness, and the peel stiffness by a known method.

It is preferable that the pitch stiffness and the roll stiffness be made as small as feasible in order to increase the recording density and improve tracking performance. In a flexure shaped as shown in FIG. 2, however, if the width of the arm 8 is narrowed to lower the pitch stiffness and the roll stiffness to levels equivalent to those of the flexure 100 shown in FIG. 8, it results in the peel stiffness being lowered at the same time down to 25 N/m. It has therefore been difficult to solve the problem to be solved by the present invention.

The reason why the embodiments of the present invention can offer outstanding characteristics as detailed in the foregoing are as follows. First of all, the reason is that a loop spring structure formed by the main arms 104a, 104b and the supporting arms 108a, 108b extending from the fixing point 102a on the leading end side can give the flexure tongue a dominant stiffness. To state it from another standpoint, a loop spring structure formed by the sub arms 106a, 106b and the supporting arms 108a, 108b supports the flexure tongue so as to give an auxiliary or a weak stiffness thereto.

As a result, when determining parameter values of the dominant loop spring structure, it is not necessary to take into consideration so seriously the stiffness given by the auxiliary loop spring structure and the wiring layers 118a, 118b. This allows the distance from the DCP to the fixing point 102a to be shortened as appropriately within a limit of physical restrictions, which in turn allows the peel stiffness to be made larger. Since the material and thickness of the metal layer are constant according to the specific embodiments of the present invention, the path length of the strip-shaped portion, and the shape and width of the path are the parameters governing stiffness available for the dominant loop spring structure.

As values of these parameters are changed, it also affects the peel stiffness, though the rate of change of the peel stiffness is not very large. It is therefore possible relatively easily to determine the parameter values that ensure small pitch stiffness and small roll stiffness, while keeping the peel stiffness large. This is made possible because of the adoption of the flexure structure allowing the parameter values making the different types of stiffness compatible with each other to be established by separating the distance from the DCP to the supporting area on the leading end side from the parameters of the dominant loop spring structure governing the pitch stiffness and the roll stiffness. The DCP is the main parameter governing the peel stiffness. If the material and the thickness of the metal layer can be changed, it increases the number of types of parameters, allowing the stiffness to be controlled even more accurately. This may, however, be said to be a tradeoff between a manufacturing cost and effects.

Some design features are provided in order to establish parameter values for making the effects on stiffness produced by the loop spring structure formed by the sub arms smaller than the effects on stiffness produced by the loop spring structure formed by the main arms. Specifically, a difference is provided in the width or path length of the main arms or the sub arms after they branch out from the supporting area 120 or 122. The wiring layer is formed so as to minimize the effects on the stiffness by elongating the length of the area in which the wiring layer is disposed in a space from a position where the wiring layer is separated from the supporting area 122 to a position where the wiring layer is laminated again in the flexure tongue.

Figure 10:
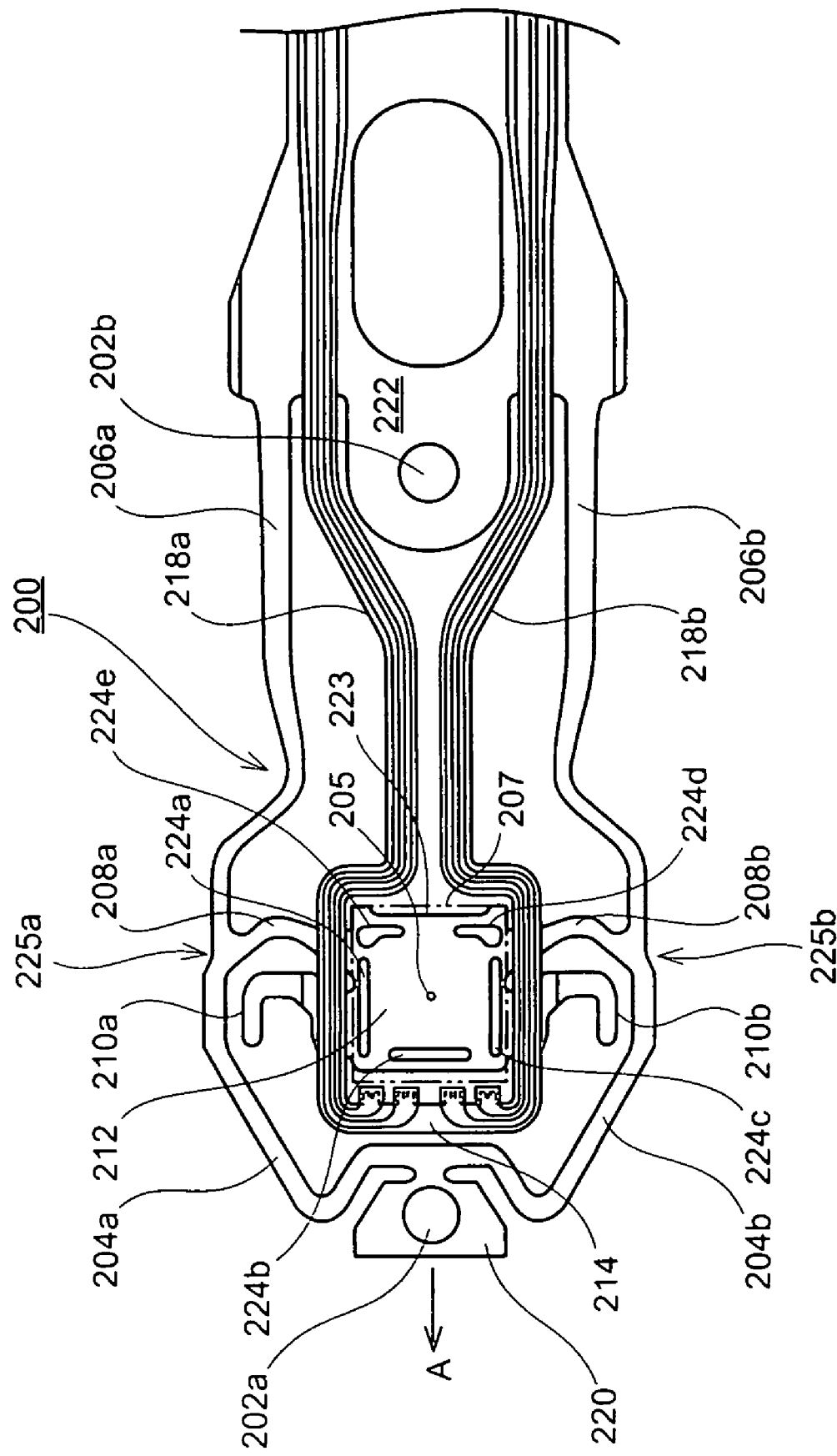
FIG. 10 shows a flexure according to another embodiment of the present invention.

FIG. 10 shows a flexure according to another embodiment of the present invention. The material, thickness, lamination structure, and manufacturing method for a flexure 200 are the same as those of the flexure 100. An explanation of these aspects will therefore be omitted. A metal layer of the flexure 200 includes a supporting area 220 on the leading end side spot-welded to the load beam at a fixing point 202*a*, a supporting area 222 on the supporting end side spot-welded to the load beam at a fixing point 202*b*, and a flexure tongue 212 supporting the slider. The flexure 200 of this embodiment is applied to a magnetic disk device rotating in a forward direction with a magnetic disk being rotated in the direction of arrow A.

The metal layer extends, as a pair of strip-shaped main arms 204*a* and 204*b*, toward the supporting end side from an area near the fixing point 202*a* provided in the supporting area 220 on the leading end side. According to the embodiment, a pair of limiters 210*a* and 210*b* extend in a direction perpendicular to a center line from a center of side edges of the flexure tongue 212. In addition, in order to support the flexure tongue 212 from both ends of the side edge located between the leading edge and a center of the slider mounting position in the direction of the center line, the main arms form a path to bulge in the direction perpendicular to the center line so as to form a large loop spring structure.

The main arms 204*a*, 204*b* meet sub arms 206*a*, 206*b* at positions 225*a*, 225*b*, respectively, to form supporting arms 208*a*, 208*b*, respectively. The supporting arms 208*a*, 208*b* support the side edges of the flexure tongue 212 from both sides. The metal layer extends, as a pair of the strip-shaped sub arms 206*a*, 206*b*, toward the leading end side from an area near the fixing point 202*b* provided in the supporting area 222 on the supporting end side. The sub arms 206*a*, 206*b* extend substantially parallel with respect to the center line and then bulge before meeting the main arms at the positions 225*a*, 225*b*, respectively. The sub arms form, by way of the supporting arms 208*a*, 208*b*, a loop spring structure for supporting the flexure tongue. The main arms 204*a*, 204*b* each have a width of about 0.1 mm for a portion from a position where the main arms branch out from the supporting area 220 to each of the positions 225*a*, 225*b*. The sub arms 206*a*, 206*b* each have a width of about 0.125 mm at a portion near the supporting area 222 and a width of about 0.075 mm at a portion near each of the positions 225*a*, 225*b*.

A path length of the sub arms 206*a*, 206*b* from where the sub arms branch from the supporting area 222 on the supporting end side to where the sub arms reach the positions 225*a*, 225*b* is made long. A length from where wiring structures 218*a*, 218*b* leave the supporting area 222 to where the wiring structures are laminated again on the flexure tongue 212 is made long. These arrangements help reduce a degree of contribution of these length factors to the stiffness of the flexure. According to the embodiment of the present invention, the path length of the sub arms is set to about 1.2 times as long as the path length of the main arms, and the distance between the DCP and the fixing point 202*b* is set to about 2.0 times as long as the distance between the fixing point 202*a* and the DCP.

The limiters 210*a*, 210*b* are formed for the flexure tongue 212 by the metal layer. The limiters 210*a*, 210*b* are engaged with an opening portion in the load beam when the flexure is mounted to the load beam. When the slider is retracted to the ramp, the limiters 210*a*, 210*b* cause the flexure to flex by a large amount due to an external impact, thereby limiting a behavior of the slider's colliding with other slider or ramp. The limiters 210*a*, 210*b* are formed as the metal layer of the flexure 200 before being formed by a bending operation.

Polyimide areas 224*a* to 224*e* are formed on the flexure tongue 212. The slider is bonded thereon to a slider supporting area indicated by a dash-double-dot line 207 using an adhesive. A platform 214 is formed on the trailing edge side of the flexure tongue 212. The flexure 200 according to the embodiment exhibits a peel stiffness of 67 N/m, a pitch stiffness of 0.68 μNm/deg., and a roll stiffness of 0.77 μNm/deg. As compared with the flexure 6 used in the conventional structure explained with reference to FIG. 2, the flexure 200 has a lower pitch stiffness down to 44% and a lower roll stiffness down to 56%, respectively, though having an equivalent peel stiffness.

The reason why the flexure 200 is designed to offer a lower pitch stiffness and a lower roll stiffness, while maintaining a higher peel stiffness, as compared with the conventional flexure is that the metal layer of the flexure 200 has a characteristic shape of the same nature as that of the flexure 100. More specifically, a loop spring structure supported by the fixing point 202*a* on the leading end side, which is dominant in terms of stiffness, and a loop spring structure supported by the fixing point 202*b* on the supporting end side, which is auxiliary in terms of stiffness, are introduced to support the flexure tongue. An effect of the auxiliary loop spring structure and the wiring layers 218*a*, 218*b* on stiffness of the flexure tongue is thereby sufficiently minimized and the distance from a DCP 205 to the fixing point 202*a* is shortened as appropriately within a limit of physical restrictions.

Figure 11:
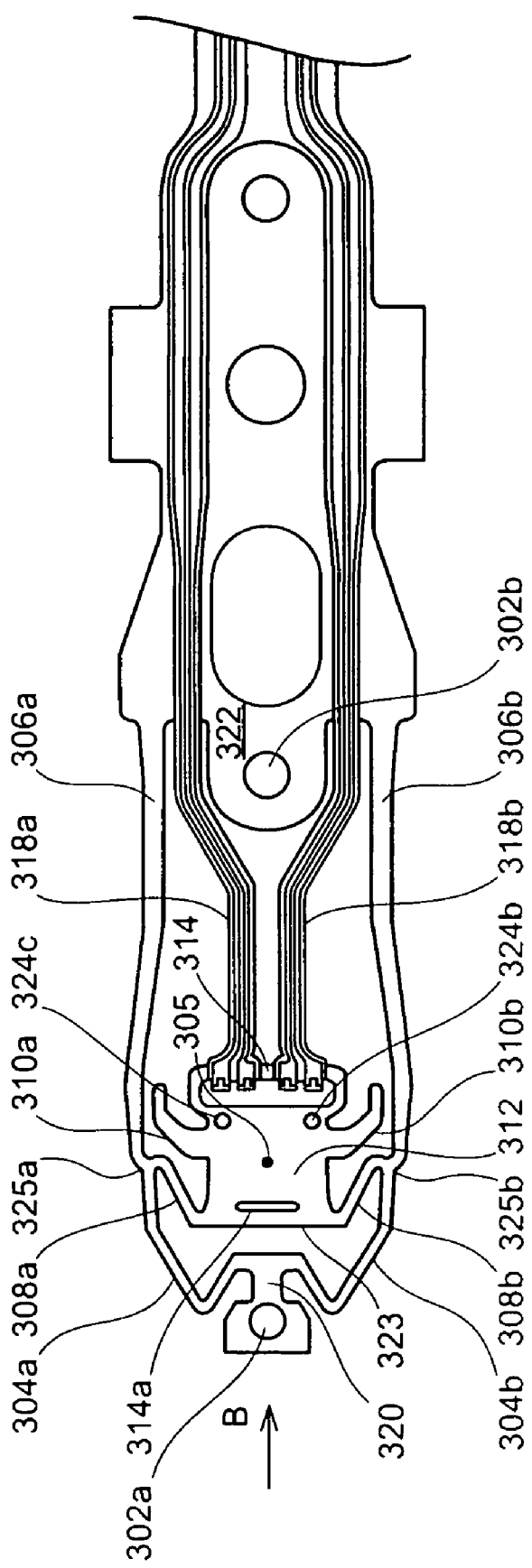
FIG. 11 shows a flexure according to an another embodiment of the present invention.

FIG. 11 shows a flexure according to yet another embodiment of the present invention. The material, thickness, lamination structure, and manufacturing method for a flexure 300 are the same as those of the flexure 100. An explanation of these aspects will therefore be omitted. A metal layer of the flexure 300 includes a supporting area 320 on the leading end side spot-welded to the load beam at a fixing point 302*a*, a supporting area 322 on the supporting end side spot-welded to the load beam at a fixing point 302*b*, and a flexure tongue 312 supporting the slider.

The metal layer extends, as a pair of strip-shaped main arms 304*a* and 304*b*, from an edge portion of the supporting area 320 on the leading end side, first slantwise toward the leading end side and then is bent extendedly toward the supporting end side. The main arms 304*a*, 304*b* meet sub arms 306*a*, 306*b* at positions 325*a*, 325*b*, respectively, to form supporting arms 308*a*, 308*b*, respectively. To apply the flexure 300 of this embodiment to a magnetic disk device rotating in a backward direction indicated by the direction of arrow B in FIG. 4, a leading edge 323 of a flexure tongue 312 is disposed on the leading end side and, moreover, brought extremely near to the fixing point 302*a*.

To keep the pitch stiffness and the roll stiffness low, therefore, the main arms 304*a*, 304*b* follow a rather complicated path as they extend up to the positions 325*a*, 325*b*, respectively, in such a manner that a relatively long path length can be obtained. The supporting arms 308*a*, 308*b* support from both sides of the side edges at positions near the leading edge of the flexure tongue 312.

A pair of limiters 310a and 310b extend from a position near a center of side edges of the flexure tongue 312 in a direction substantially perpendicular to a center line passing through the fixing points 302a and 302b. The metal layer extends, as a pair of the strip-shaped sub arms 306a, 306b, toward the leading end side substantially parallel with the center line from an area near the fixing point 302b provided in the supporting area 322 on the supporting end side. The sub arms 306a, 306b extend substantially parallel with respect to the center line and then slightly bulge so as not to interfere with the limiters 310a, 310b, respectively. The sub arms 306a, 306b then meet the main arms 304a, 304b at the positions 325a, 325b, respectively, to form the supporting arms 308a, 308b, respectively. According to the embodiment, the main arms 304a, 304b each have a width of about 0.075 mm for a portion from a position where the main arms branch out from the supporting area 320 to each of the positions 325a, 325b. The sub arms 306a, 306b each have a width of about 0.125 mm at a portion near the supporting area 322 and a width of about 0.075 mm at a portion near each of the positions 325a, 325b.

Polyimide areas 324a to 324c are formed on the flexure tongue 312. The slider (not shown) is mounted thereon and bonded to the flexure tongue 312 using an adhesive. A platform 314 is formed on the trailing edge side of the flexure tongue 312, providing an area functioning as a supporting structure for wiring structures 318a, 318b and an area for bonding. The path length of the sub arms 306a, 306b is set to about 1.8 times as long as the path length of the main arms 304a, 304b, and the distance between a DCP 305 and the fixing point 302b is set to be about 2.6 times as long as the distance between the fixing point 302a and the DCP 305.

The flexure 300 according to the embodiment exhibits a peel stiffness of 100.79 N/m, a pitch stiffness of 0.666 μNm/deg., and a roll stiffness of 0.744 μNm/deg. As compared with the flexure 6 used in the conventional structure explained with reference to FIG. 2, the flexure 300 has a lower pitch stiffness down to 43% and a lower roll stiffness down to 54%, though having a higher peel stiffness up to 142%.

The flexure 300 successfully creates an effective stiffness, with the metal layer thereof being provided with a characteristic shape of the same nature as that of the flexure 100 and the flexure 200. The distance between the DCP 305 and the fixing point 302a on the leading end side is made shorter than the distance between the DCP 305 and the fixing point 302b on the supporting end side. A loop spring structure made up of the main arms 304a, 304b and the sub arms 306a, 306b thus independently gives the flexure tongue 312 stiffness.

These arrangements result in the following. Specifically, even with a flexure applied to a magnetic disk device rotating in the backward direction, in which the flexure tongue is supported at a point near the fixing point 302a, values are appropriately selected for parameters of the path length of the main arms and the shape and width of the path, as affecting the loop spring structure formed by the main arms so as to maintain the peel stiffness and reduce the pitch stiffness and the roll stiffness, thereby achieving good characteristics.

The specific embodiments of the present invention supporting the flexure tongue using two spring structures, i.e., the dominant loop spring structure and the auxiliary loop spring structure, have been described in detail with reference to the respective examples shown in FIGS. 8, 10, and 11.

According to these embodiments of the present invention, the loop spring structure including the main arms gives the flexure tongue stiffness dominantly from the leading end side. This arrangement allows values of different parameters governing the stiffness to be defined separately from each other. Parameters governing the peel stiffness are mainly the distance between the DCP and the fixing point on the leading end side. In contrast, parameters governing the pitch stiffness and the roll stiffness are mainly the thickness of the metal layer, the width and material of the band-shaped portion, the path length of the arms, and the like.

According to the embodiments, since the material and the thickness are fixed as described in the foregoing, parameters such as the path length, path width, the shape of the path, and the like can be adjusted. Under a given material and a given thickness, the path length of the sub arms is made longer than the path length of the main arms, preferably about 1.2 times or more as long, and more preferably about 1.5 times or more as long.

Further, the distance from the DCP to the fixing point on the supporting end side is made longer than the distance from the fixing point on the leading end side to the DCP, preferably about 1.5 times or more as long, and more preferably about 1.8 times or more as long. The upper limit of the distance may be established in accordance with an overall dimension of the suspension assembly, manufacturing conditions, and the like.

Calculation, using the finite element method, of a ratio of stiffness given by each of the dominant loop spring structures to that given by each of the auxiliary loop spring structures for the flexures 100, 200, and 300 exemplified as the embodiments shows that the ratio is substantially about 70% to 30% for the flexure 100, the ratio is substantially about 60% to 40% for the flexure 200, and the ratio is substantially about 90% to 10% for the flexure 300.

As regards the preferable range of the rate of stiffness in the present invention, of the stiffness given by the two loop spring structures to the flexure tongue, a ratio (a dominant ratio) of the stiffness of the auxiliary loop spring structure to the entire stiffness is preferably set to 40% or less, more preferably to 30% or less, and even more preferably to 10% or less. As a representative characteristic for evaluating the dominant ratio of the stiffness, either the pitch stiffness or the roll stiffness, or both, may be selected. The dominant ratio can be obtained as follows. Stiffness is measured when both the sub arms and the main arms support the flexure tongue. Stiffness is then measured by cutting off either the loop of the main arms or the loop of the sub arms supporting the flexure tongue. The two measurements of the stiffness are then compared with each other.

The sub arms accounts for a small dominant ratio of stiffness and therefore are not indispensable to creating appropriate three types of stiffness; however, the sub arms form an essential constituent for realizing mass production of flexures. The sub arms have a function of enhancing operability by maintaining a stabilized shape of an entire flexure in an assembly process assembling the flexure and the load beam. Without the sub arms, a portion composed of the main arms, supporting arms, and the flexure tongue is connected to the supporting area on the supporting end side through only the dielectric layer, the copper layer, and the cover layer. This makes it difficult to assemble the portion with the load beam.

According to the embodiments, the main arms and the sub arms meet to integrally form the supporting arms which, in turn, support the leading edge or the side edge of the flexure tongue. The spirit of the present invention nonetheless includes an arrangement in which the main arms and the sub arms support the flexure tongue, symmetrically and independently of each other without forming the supporting arms.

A construction in which the supporting arms support the flexure tongue in accordance with the specific embodiments of the present invention will be explained. The flexure tongue as explained with reference to FIGS. 8, 10, and 11 is supported at a position on the leading edge side in relation to the center of the mounting position of the slider. The "leading edge side" refers to both the leading edge itself of the flexure tongue and the side edge of the flexure tongue existing between the center of the slider mounting position and the leading edge.

When the supporting point for the flexure tongue is provided on the leading edge side, the flexure exhibits appropriate behavior in relation to the vertical motion of the slider involved during the slider's motion of loading and unloading operation when the slider is retracted (unloaded) in the ramp and returned (loaded) therefrom. The leading edge is the side on which the air bearing surface of the slider first receives the viscous air flow of the air bearing. During unloading, that is, when the slider is retracted from the disk surface into the ramp, it is necessary to ensure that the slider does not receive a negative pressure of the load beam to come into contact with the disk.

If the flexure tongue is supported on the leading edge side as described in the embodiment, a greater lifting force acts on the leading edge side than on the trailing edge side during unloading, which allows the slider to be less liable to come into contact with the disk. During unloading, that is, when the slider is returned to a position above a rotating magnetic disk surface, the slider, if lowered with the trailing edge side first, receives an appropriate ascending force from the air flow, thus being capable of shifting to a floating motion without coming into contact with the disk.

It will be understood that the foregoing description has been made on the specific embodiments of the present invention shown on the accompanying drawings and that the invention is not limited thereto, but may be otherwise variously embodied in any known arrangements as long as the effects of the present invention are produced.

According to the embodiments of the present invention, it is possible to provide a suspension assembly exhibiting performance excellent in the track follow-up ability, impact resistance, and load/unload operations. Further, it is possible to provide a suspension assembly exhibiting small pitch stiffness and small roll stiffness, while ensuring large peel stiffness. In addition, it is possible to provide a rotary disk storage device using such a suspension assembly as those described above.

What is claimed is:

1. A suspension assembly including a load beam and a flexure supporting a slider, said flexure comprising:
   a first supporting area connected to said load beam on a leading end side;
   a second supporting area connected to said load beam on a supporting end side;
   a flexure tongue provided with a supporting area of said slider, a dimple contact point, and a leading edge;
   a metal layer including:
      a first loop spring structure extending from said first supporting area so as to support said flexure tongue and having a parameter for giving stiffness to said flexure tongue; and
      a second loop spring structure extending from said second supporting area so as to support said flexure tongue and having a parameter for giving stiffness to said flexure tongue, a value of said parameter being selected in such a manner that said second loop spring structure gives a stiffness smaller than the stiffness said first loop spring structure gives to said flexure tongue; and
   a wiring layer laminated on said metal layer in said second supporting area and extendedly branching from said second supporting area toward said slider.

2. The suspension assembly according to claim 1, wherein said first loop spring structure and said second loop spring structure constitute a pair of strip-shaped arms each formed of the metal layer.

3. The suspension assembly according to claim 2, wherein each of said parameters of said first and second loop spring structures is selected as one or a combination of two or more from the group consisting of a material, a path length, a thickness, a width, and a path shape of the strip-shaped arms formed of said metal layer.

4. The suspension assembly according to claim 2, wherein said metal layer is a stainless steel having a thickness ranging from about 0.015 mm to 0.025 mm.

5. The suspension assembly according to claim 4, wherein the path length of said second loop spring structure is about 1.2 times or more as long as the path length of said first loop spring structure.

6. The suspension assembly according to claim 4, wherein either the width of said first loop spring structure or the width of said second loop spring structure is about 0.150 mm or less.

7. The suspension assembly according to claim 4, wherein said first supporting area is connected to said load beam at a first fixing point passing through a center line of said load beam, said second supporting area is connected to said load beam at a second fixing point passing through a center line of said load beam, the pair of strip-shaped arms constituting said first loop spring structure extends from an area near said first fixing point in said first supporting area, and the pair of strip-shaped arms constituting said second loop spring structure extends from an area near said second fixing point in said second supporting area.

8. The suspension assembly according to claim 7, wherein a distance from said dimple contact point to said second fixing point is about 1.5 times or more as long as a distance from said first fixing point to said dimple contact point.

9. The suspension assembly according to claim 7, wherein the distance from said first fixing point to said dimple contact point is about 1.25 mm or less.

10. The suspension assembly according to claim 1, wherein said first loop spring structure and said second loop spring structure support said flexure tongue at a point on a side of the leading edge in relation to a center of the supporting area of said slider.

11. The suspension assembly according to claim 1, wherein said first loop spring structure and said second loop spring structure are provided with a common portion and said common portion, instead of said first loop spring structure and said second loop spring structure, supports said flexure tongue.

12. The suspension assembly according to claim 1, wherein said wiring layer includes a copper layer and a dielectric layer.

13. The suspension assembly according to claim 12, wherein a thickness of said metal layer ranges from about 0.015 mm to 0.025 mm, a thickness of said dielectric layer ranges from about 0.005 mm to 0.020 mm, and a thickness of said copper layer ranges from about 0.005 mm to 0.020 mm.

14. The suspension assembly according to claim 1, wherein said dimple contact point is given as a contact portion between a dimple formed on said load beam and said flexure tongue.

15. The suspension assembly according to claim 1, wherein said dimple contact point is given as a contact portion between a dimple formed on said flexure and said load beam.

16. The suspension assembly according to claim 1 further comprising a limiter, formed of part of said metal layer, extending from said flexure tongue.

17. A suspension assembly including a load beam and a flexure connected to said load beam and supporting a slider, said flexure comprising:
- a flexure tongue provided with a supporting area of said slider;
- a first spring structure supporting a first supporting area connected to said load beam on a leading end side and said flexure tongue in such a manner as to extend from said first supporting area for giving a dominant stiffness to said flexure tongue;
- a second spring structure supporting a second supporting area connected to said load beam on a supporting end side and said flexure tongue in such a manner as to extend from said second supporting area for giving an auxiliary stiffness to said flexure tongue; and
- a wiring layer laminated on said metal layer in said second supporting area and extendedly branching from said second supporting area toward said slider.

18. The suspension assembly according to claim 17, wherein a stiffness given by said second spring structure to said flexure tongue is about 40% or less of a stiffness given by said first spring structure and said second spring structure to said flexure tongue.

19. The suspension assembly according to claim 18, wherein said stiffness is a pitch stiffness or a peel stiffness of said flexure tongue.

20. A rotary disk storage device, comprising:
- a rotary disk;
- a head reading and writing data from and to said rotary disk, or either reading or writing data from or to said rotary disk;
- a slider mounted with said head;
- a suspension assembly supporting said slider; and
- an actuator mechanism supporting said suspension assembly, said suspension assembly being one as recited in claim 1.

21. The rotary disk storage device according to claim 20, further comprising a ramp in which said slider is retracted.

22. The rotary disk storage device according to claim 20, wherein said actuator mechanism turns about a pivot shaft above a surface of said rotary disk.

23. A rotary disk storage device, comprising:
- a rotary disk;
- a head reading and writing data from and to said rotary disk, or either reading or writing data from or to said rotary disk;
- a slider mounted with said head;
- a suspension assembly supporting said slider; and
- an actuator mechanism supporting said suspension assembly, said suspension assembly being one as recited in claim 17.

24. The rotary disk storage device according to claim 23, further comprising a ramp in which said slider is retracted.

25. The rotary disk storage device according to claim 23, wherein said actuator mechanism turns about a pivot shaft above a surface of said rotary disk.

* * * * *